(12) United States Patent
Shiraishi et al.

(10) Patent No.: US 11,355,988 B2
(45) Date of Patent: Jun. 7, 2022

(54) STATOR MANUFACTURING METHOD AND MOTOR

(71) Applicant: Nidec Corporation, Kyoto (JP)

(72) Inventors: Takashi Shiraishi, Kyoto (JP); Takayuki Migita, Kyoto (JP); Hisashi Fujihara, Kyoto (JP); Masato Aono, Kyoto (JP); Shuhei Nakamatsu, Kyoto (JP)

(73) Assignee: Nidec Corporation, Kyoto (JP)

( * ) Notice: Subject to any disclaimer, the term of this patent is extended or adjusted under 35 U.S.C. 154(b) by 389 days.

(21) Appl. No.: 16/479,289

(22) PCT Filed: Jan. 6, 2018

(86) PCT No.: PCT/JP2018/000134
§ 371 (c)(1),
(2) Date: Jul. 19, 2019

(87) PCT Pub. No.: WO2018/142845
PCT Pub. Date: Aug. 9, 2018

(65) Prior Publication Data
US 2019/0386535 A1    Dec. 19, 2019

(30) Foreign Application Priority Data

Feb. 6, 2017 (JP) .............................. JP2017-019691

(51) Int. Cl.
*H02K 1/14* (2006.01)
*H02K 3/52* (2006.01)
(Continued)

(52) U.S. Cl.
CPC .............. *H02K 3/522* (2013.01); *B23P 19/02* (2013.01); *H02K 1/146* (2013.01);
(Continued)

(58) Field of Classification Search
CPC ..... H02K 3/522; H02K 1/146; H02K 2203/09
See application file for complete search history.

(56) References Cited

U.S. PATENT DOCUMENTS 3,979,615 A * 9/1976 Neff ...................... H01R 4/2445
310/71
4,038,573 A * 7/1977 Hillyer ............... H02K 15/0068
310/71
(Continued)

FOREIGN PATENT DOCUMENTS

JP    2004-056873 A    2/2004
JP    2010-172086 A    8/2010
(Continued)

OTHER PUBLICATIONS

Official Communication issued in International Patent Application No. PCT/JP2018/000134, dated Mar. 13, 2018.

*Primary Examiner* — Dang D Le
(74) *Attorney, Agent, or Firm* — Keating & Bennett

(57) ABSTRACT

A stator includes a stator core disposed about a central axis and covered by an insulator, coils installed on the stator core through the insulator, and an intermediate bus bar electrically connected to a portion of a conducting wire constituting the coils. A method of manufacturing a stator includes a mounting process, a winding process, and a connecting process. An intermediate bus bar is supported at a first position spaced apart from a coil in an axial direction in a mounting portion before the start of the winding process. The intermediate bus bar is fixed at a second position between the first position and the coils in the axial direction after the completion of the winding process.

11 Claims, 27 Drawing Sheets

(51) Int. Cl.
*B23P 19/02* (2006.01)
*H02K 15/00* (2006.01)
*H02K 15/02* (2006.01)

(52) U.S. Cl.
CPC ....... *H02K 15/0062* (2013.01); *H02K 15/022* (2013.01); *H02K 2203/09* (2013.01)

(56) References Cited

U.S. PATENT DOCUMENTS 6,800,973 B2 * 10/2004 Futami ................. H01R 4/2458
310/71
2011/0001388 A1 1/2011 Fujii et al.

FOREIGN PATENT DOCUMENTS

| JP | 2011-035984 A | 2/2011 |
| JP | 2013-201820 A | 10/2013 |
| JP | 2016-178774 A | 10/2016 |

* cited by examiner

STATOR MANUFACTURING METHOD AND MOTOR

CROSS REFERENCE TO RELATED APPLICATIONS

This is the U.S. national stage of PCT Application No. PCT/JP2018/000134, filed on Jan. 6, 2018, and priority under 35 U.S.C. § 119(a) and 35 U.S.C. § 365(b) is claimed from Japanese Application No. 2017-019691, filed Feb. 6, 2017; the entire disclosures of which are incorporated herein by reference.

FIELD OF THE INVENTION

The present disclosure relates to a method of manufacturing a stator, and a motor.

BACKGROUND

In a conventional motor, a bus bar connected to an external power supply side is connected to a coil of a stator to supply a current to the stator. In a related art, an end of a conductive wire forming a coil is inserted into a connection part of a bus bar and caulked, and is also welded.

Here, when forming a coil by automatically winding a conductive wire using a winding machine, conventionally, it has been difficult to locate an end of the conductive wire at a connection part of a bus bar. Thus, an automatic assembly including caulking and welding of the bus bar and a stator coil was difficult in subsequent processes.

SUMMARY

Example embodiments of the present disclosure provide methods of manufacturing stators, each of which is capable of facilitating a winding process in which coils are installed on a stator core, and a motor.

An example embodiment of the present disclosure provides a method of manufacturing a stator including a stator core disposed about a central axis and covered by an insulator, a plurality of coils installed on the stator core through the insulator, and an intermediate bus bar electrically connected to a portion of a conducting wire constituting the coil, and the method includes a mounting process in which the intermediate bus bar is mounted on a mounting portion of the insulator, a winding process in which each of the coils is installed on the stator core through the insulator, and a connecting process in which a portion of the conducting wire is electrically connected to the intermediate bus bar, wherein the mounting process includes a supporting process in which the intermediate bus bar is supported at a first position spaced apart from the coil in an axial direction in the mounting portion before the start of the winding process, and a fixing process in which the intermediate bus bar is fixed at a second position between the first position and the coil in the axial direction after the completion of the winding process.

Another example embodiment of the present disclosure provides a motor including a rotor rotatable about a central axis extending in a vertical direction, and an annular-shaped stator facing the rotor in a radial direction and driving the rotor, wherein the stator includes a stator core disposed about the central axis, an insulator covering the stator core, a plurality of coils installed on the stator core through the insulator, and an intermediate bus bar electrically connected to a portion of a conducting wire constituting the coils, wherein the intermediate bus bar includes a holder electrically connected to the conducting wire, the insulator includes a mounting portion on which the intermediate bus bar is mounted, at least one of the intermediate bus bar and the mounting portion includes a support capable of supporting the intermediate bus bar at a first position spaced apart from the coils in an axial direction, and the mounting portion fixes the intermediate bus bar at a second position between the first position and the coils in the axial direction.

The above and other elements, features, steps, characteristics and advantages of the present disclosure will become more apparent from the following detailed description of the example embodiments with reference to the attached drawings.

DETAILED DESCRIPTION

Example embodiments of the present disclosure will be described with reference to the drawings below.

Further, in the present specification, a direction parallel to a central axis CA in a motor 100 is referred to as an "axial direction". In addition, in the axial direction, a direction from a first bearing 113 toward a second bearing 125 is referred to as "upward", and a direction from the second bearing 125 toward the first bearing 113 is referred to as "downward". Also, in surfaces of each component, a surface facing upward in the axial direction is referred to as an "upper surface", and a surface facing downward in the axial direction is referred to as a "lower surface".

Further, a direction orthogonal to the central axis CA is referred to as a "radial direction". In addition, in the radial direction, a direction toward the central axis CA is referred to as "inward", and a direction away from the central axis CA is referred to as "outward". Also, in side surfaces of each component, a side surface facing inward in the radial direction is referred to as an "inner side surface", and a side surface facing outward in the radial direction is referred to as an "outer side surface".

Further, a circumferential direction about the central axis CA is referred to as a "circumferential direction". In addition, in the circumferential direction viewed from the top in the axial direction, a clockwise direction is referred to as a "clockwise direction", and a counterclockwise direction is referred to as a "counterclockwise direction".

Further, the designations of the directions and surfaces described above do not indicate the positional relationship and direction in the case of being incorporated into an actual device.

Example Embodiment

Figure 1:
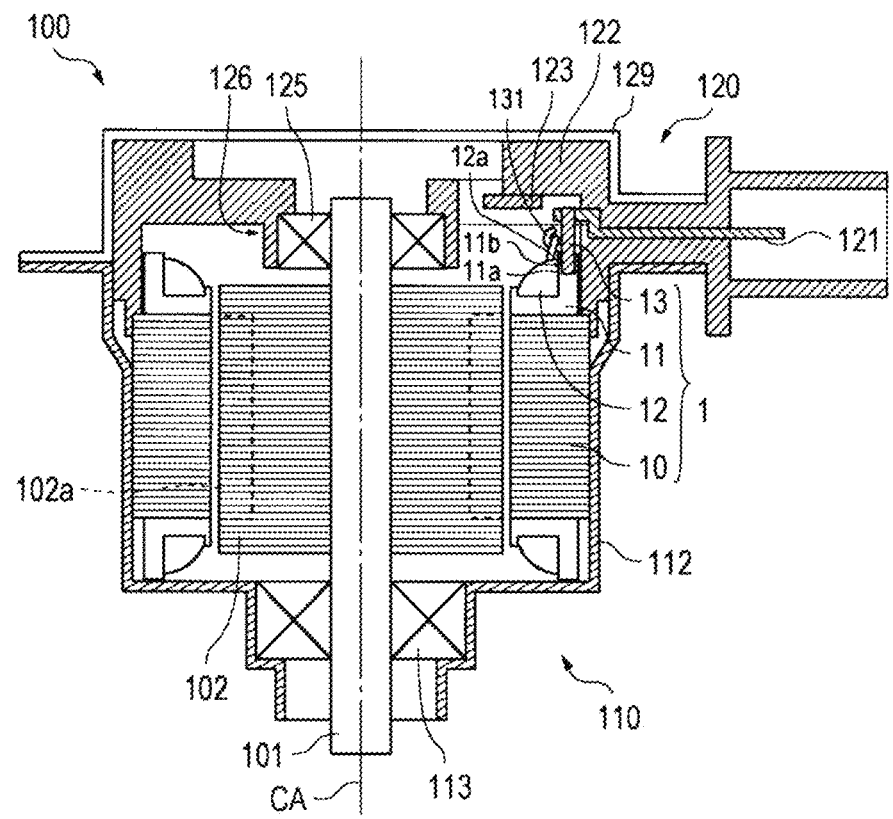
FIG. 1 is a cross-sectional view illustrating a configuration example of a motor.

FIG. 1 is a cross-sectional view illustrating a configuration example of a motor 100. In FIG. 1, the motor 100 is cut at a cut surface including a central axis CA. The motor 100 of FIG. 1 is an inner-rotor type three-phase motor.

As shown in FIG. 1, the motor 100 includes a shaft 101, a rotor 102, a housing unit 110, and a bus bar unit 120. The housing unit 110 includes a stator 1, a housing 112, and a first bearing 113. Further, the bus bar unit 120 includes a main-bus bar 121, a bus bar holder 122, a substrate 123, a second bearing 125, a bearing holder 126, and a bracket 129.

The shaft 101 is a rotating shaft extending in a vertical direction along the central axis CA and includes the rotor 102.

The rotor 102 is rotatable with the shaft 101 about the central axis CA extending in the vertical direction. The rotor 102 is a laminate formed by laminating electromagnetic steel plates and includes a rotor magnet 102a for rotational driving.

Next, the configuration of the housing unit 110 will be described. The housing 112 is a metal cylindrical body having a bottom. When viewed from an axial direction, an opening through which the shaft 101 is inserted is formed at a center of the bottom, which is centered on the central axis CA, of the housing 112. Further, the first bearing 113 is held in the opening in a radial direction. The first bearing 113 rotatably supports the shaft 101 in a lower portion of the housing 112 (or housing unit 110) in the axial direction.

Figure 18:
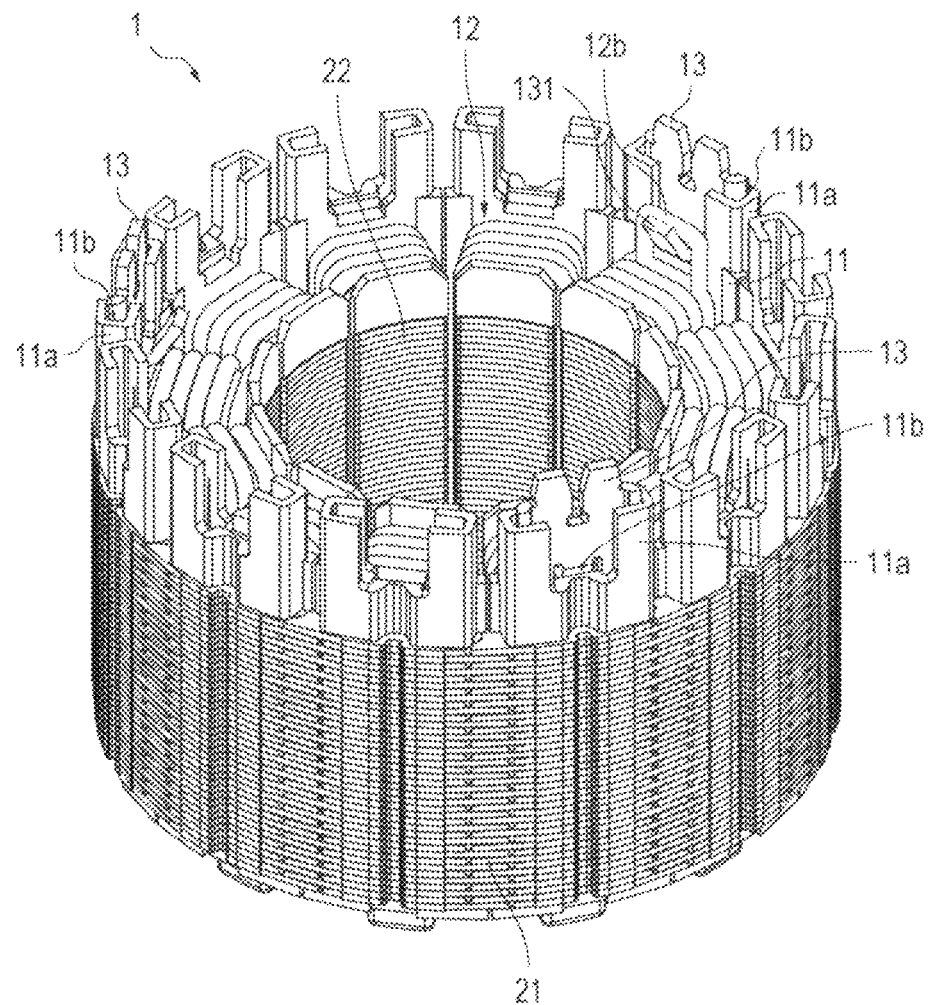
FIG. 18 is a perspective view for describing an example of a ring-shape forming process.

The stator 1 has an annular shape, faces the rotor 102 in the radial direction, and drives the rotor 102. The stator 1 includes a stator core 10, an insulator 11, a plurality of coils 12, and an intermediate bus bar 13 as shown in FIG. 18 to be described below.

The stator core 10 is formed by disposing a plurality of laminated core pieces 2 in an annular shape. The laminated core piece 2 is a laminate formed by laminating electromagnetic steel plates. The laminated core piece 2 includes a core back 21 having an arc-shape and a tooth portion 22 extending inward from the core back 21 in the radial direction. The coil 12 is wound around the tooth portion 22. The number of laminated core pieces 2 is twelve in the present example embodiment, but the present disclosure is not limited to this example, and the number of laminated core pieces 2 may be a plural number other than twelve. In addition, the laminated core piece 2 will be described below.

The insulator 11 is an insulating member made of resin, and is fitted into the stator core 10 to electrically insulate between the stator core 10 and each coil 12. The insulator 11 may be installed to be integrated with the laminated core piece 2 by insert molding.

Further, the insulator 11 includes a mounting portion 11a on which the intermediate bus bar 13 is mounted. The mounting portion 11a includes an accommodation groove 11b configured to accommodate at least a portion of the intermediate bus bar 13.

The plurality of coils 12 are installed on the stator core 10 through the insulator 11. Each of the coils 12 is configured with a conducting wire 12a wound around the laminated core piece 2 through the insulator 11. The conducting wire 12a is made of, for example, a metal wire coated with an insulating member such as an enamel coated copper wire. When a driving current is supplied to the coils 12, magnetic flux in the radial direction is generated in the laminated core piece 2. The stator 1 utilizes the magnetic flux to generate torque in a circumferential direction in the rotor 102 and rotate the rotor 102 about the central axis CA.

The plurality of coils 12 include U-phase coils U1 to U4, V-phase coils V1 to V4, and W-phase coils W1 to W4, as described below. Each phase coils of the U-phase coils U1 to U4, the V-phase coils V1 to V4, and the W-phase coils W1 to W4 are the coils 12 having different electric phases, and the U-phase coils U1 to U4, the V-phase coils V1 to V4, and the W-phase coils W1 to W4 are delta-connected through connection wires 12b-1, 12b-2, and 12b-3, each of which is a portion of the conducting wire 12a drawn out from the coils 12 of each phase. Hereinafter, each of the connection wires 12b-1, 12b-2, and 12b-3 may be collectively referred to as a connection wire 12b.

A first terminal between the U-phase coils U1 to U4 and the W-phase coils W1 to W4, a second terminal between the V-phase coils V1 to V4 and the U-phase coils U1 to U4, and a third terminal between the W-phase coils W1 to W4 and the V-phase coils V1 to V4 are connected to different intermediate bus bars 13a to 13c, respectively. Further, in the present example embodiment, the U-phase coils U1 to U4, the V-phase coils V1 to V4, and the W-phase coils W1 to W4, which are delta-connected, are formed by one conducting wire 12a. Accordingly, the work of wiring each coil 12 is facilitated due to the delta-connection. Thus, when the coil 12 is installed on the tooth portion 22 of each laminated core piece 2, the winding work may be easily performed. The delta-connection of each coil 12 will be described below.

Figure 2:
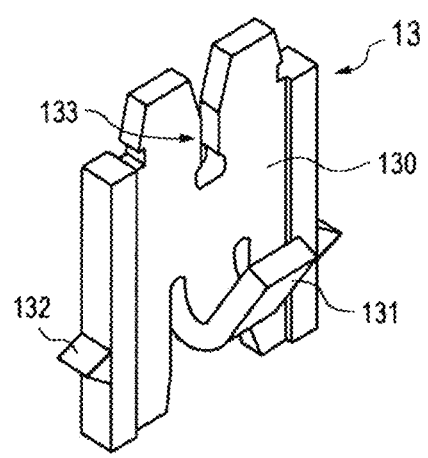
FIG. 2 is a perspective view illustrating a configuration example of an intermediate bus bar.

The intermediate bus bar 13 is made of metal such as copper and electrically connected to a portion of the conducting wire 12a constituting the coil 12. FIG. 2 is a perspective view illustrating a configuration example of the intermediate bus bar 13. As shown in FIG. 2, the intermediate bus bar 13 includes a main body 130, a holder 131 electrically connected to the conducting wire 12a, a first support 132, and a press-fit part 133.

The holder 131 is a part extending from a lower end of the main body 130 and bent in a hook shape. When the coils 12 of each phase are installed by winding the conducting wire 12a, the connection wire 12b is hooked on the holder 131. In addition, when the winding of the conducting wire 12a is completed, an insulating coating of the conducting wire 12a is melted by the heat of the holder 131 as the holder 131 is energized while pressing the tip of the holder 131 toward the main body 130. Such a bonding method may be referred to as fusing. Thus, the holder 131 holds the connection wire 12b between the holder 131 and the main body 130 securely and is electrically connected to the connection wire 12b (that is, the conducting wire 12a). For example, a method described in Japanese Patent Publication No. 5417721 may be used as a method of bonding the holder 131 and the conducting wire 12a, but the present disclosure is not limited to such a method.

Figure 3:
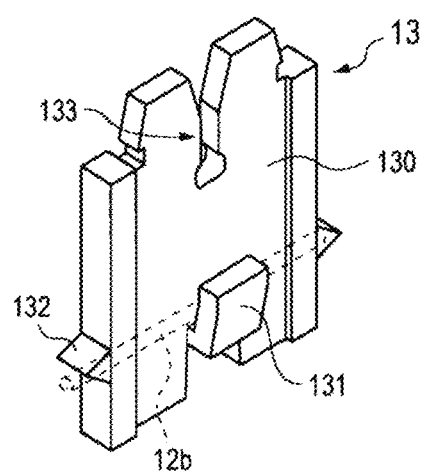
FIG. 3 is a perspective view illustrating another configuration example of the intermediate bus bar.

In addition, an electrical connection between the intermediate bus bar 13 and the connection wire 12b is shown in FIG. 2 as a configuration example of the intermediate bus bar 13, which is suitable for the bonding method called the above-described fusing, but the present disclosure is not limited such an example, and the electrical connection may be implemented by press-fitting the connection wire 12b into the holder 131. FIG. 3 is a perspective view illustrating another configuration example of the intermediate bus bar 13. In FIG. 3, the distance of a gap between the main body 130 and the holder 131 is narrower than the diameter of the connection wire 12b. Thus, when the connection wire 12b is press-fit into the gap between the main body 130 and the holder 131, the connection wire 12b is sandwiched between and held by the main body 130 and the holder 131. The insulating coating of the conducting wire 12a is peeled off when the conducting wire 12a is sandwiched between the main body 130 and the holder 131, and the conducting wire 12a is electrically connected to the intermediate bus bar 13.

Figure 4A:
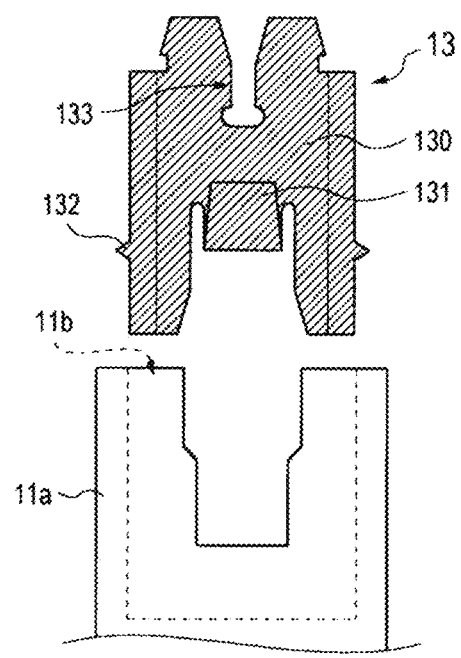
FIG. 4A illustrates a state before the intermediate bus bar is inserted into an accommodation groove in an example of a mounting process.
Figure 4B:
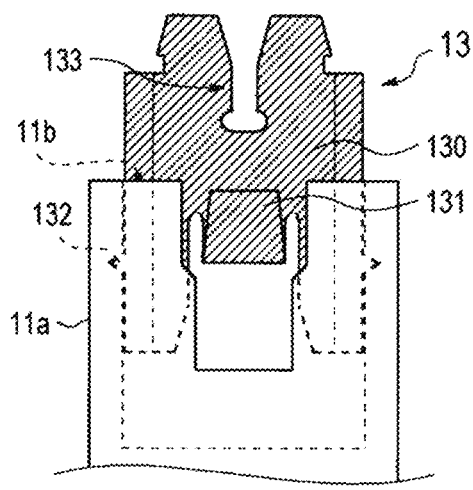
FIG. 4B illustrates a state in which the intermediate bus bar is temporarily fixed at a first position in the example of the mounting process.
Figure 4C:
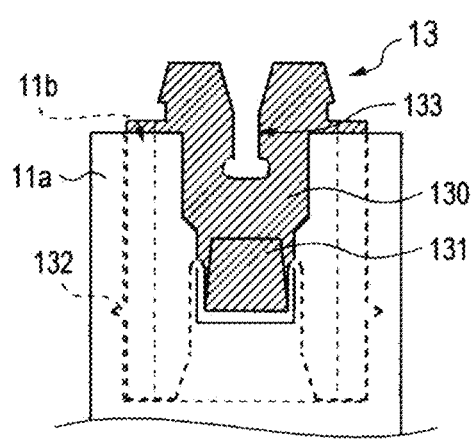
FIG. 4C illustrates a state in which the intermediate bus bar is fixed at a second position in the example of the mounting process.

A process of mounting the intermediate bus bar 13 on the mounting portion 11a of the insulator 11 will be described below. FIGS. 4A to 4C are views for describing an example of the mounting process of the intermediate bus bar 13. The first support 132 is an example of a support capable of supporting the intermediate bus bar 13 at a first position, which is spaced apart from the coil 12 in the axial direction, in the mounting portion 11a. For example, as shown in FIGS. 4A to 4C, the first position is a position (see FIG. 4B) at which the intermediate bus bar 13 stops in the middle of the accommodation groove 11b due to the relation of fitting the intermediate bus bar 13 to the accommodation groove 11b when the intermediate bus bar 13 in a state before being inserted into the mounting portion 11a (see FIG. 4A) is pressed against the mounting portion 11a with a predetermined force. Further, when the intermediate bus bar 13 is pressed with a force equal to or greater than a predetermined value, the first support 132 is further press-fit into the accommodation groove 11b. In addition, as shown in FIG. 4C, a lower end of the intermediate bus bar 13 is brought into contact with a bottom of the accommodation groove 11b, and the intermediate bus bar 13 is supported at a second position. As described above, when the intermediate bus bar 13 is accommodated in the accommodation groove 11b of the insulator 11, the intermediate bus bar 13 may be supported at positions of two stages with respect to the accommodation groove 11b in the axial direction while the first support 132 presses an inner side surface of the accommodation groove 11b.

That is, first, the lower end of the intermediate bus bar 13 in the axial direction is inserted into the accommodation groove 11b of the insulator 11, as shown in FIG. 4A. At this time, the first support 132 of the intermediate bus bar 13 is elastically in contact with the inner side surface of the accommodation groove 11b. Thus, as shown in FIG. 4B, the intermediate bus bar 13 is supported at the first position in the axial direction in the accommodation groove 11b mounted on the mounting portion 11a. The first position is a position at which the intermediate bus bar 13 is temporarily fixed with respect to the accommodation groove 11b. As will be described below, a process of installing the coils 12 of each phase by winding the conducting wire 12a in the stator core 10 is performed in a state in which the intermediate bus bar 13 is temporarily fixed to the accommodation groove 11b at the first position. Further, when the intermediate bus bar 13 supported at the first position is pushed downward in the axial direction with a force equal to or greater than a predetermined value, the intermediate bus bar 13 is further inserted downward in the axial direction into the accommodation groove 11b. Then, the intermediate bus bar 13 is supported at the second position with respect to the accommodation groove 11b in the axial direction, as shown in FIG. 4C. The second position is a position lower than the first position in the axial direction and is a position at which the intermediate bus bar 13 is completely fixed to the accommodation groove 11b. As will be described below, after the formation of the coils 12 of each phase by winding the conducting wire 12a in the stator core 10, the intermediate bus bar 13 is fixed to the accommodation groove 11b at the second position.

Figure 5A:
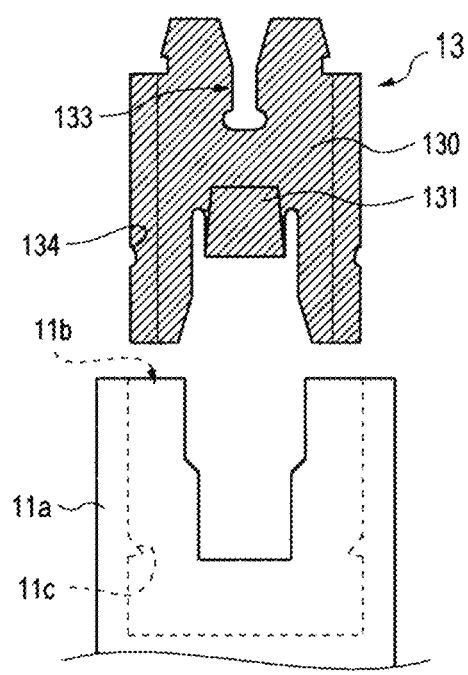
FIG. 5A illustrates a state before the intermediate bus bar is inserted into the accommodation groove in another example of the mounting process.
Figure 5B:
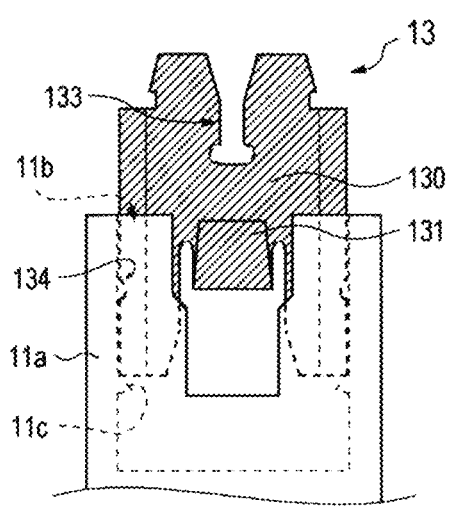
FIG. 5B illustrates a state in which the intermediate bus bar is temporarily fixed at a first position in another example of the mounting process.
Figure 5C:
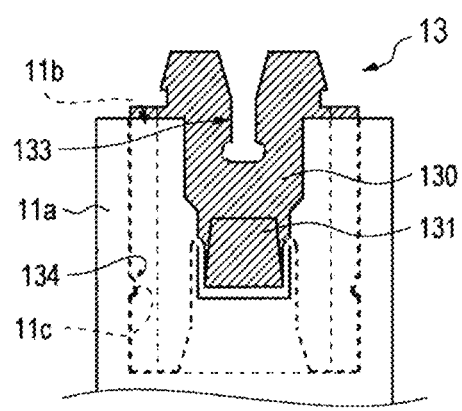
FIG. 5C illustrates a state in which the intermediate bus bar is fixed at a second position in another example of the mounting process.

Further, the configuration in which the intermediate bus bar 13 accommodated in the accommodation groove 11b is supported at the positions of two stages is not limited to the above-described example. For example, a second support 11c having the same configuration as the first support 132 may be provided in the mounting portion 11a of the insulator 11 (in particular, in the inner side surface of the accommodation groove 11b). FIGS. 5A to 5C are views for describing another example of the mounting process of the intermediate bus bar 13. As shown in FIGS. 5A to 5C, the second support 11c includes a pair of protrusions provided on, for example, inner side surfaces of the mounting portion 11a and elastically in contact with the intermediate bus bar 13. The intermediate bus bar 13 in a state before being inserted into the mounting portion 11a (see FIG. 5A) is pushed with the force equal to or greater than the predetermined value. When the lower end of the intermediate bus bar 13 is brought into contact with the second support 11c, the intermediate bus bar 13 is supported at the first position (see FIG. 5B). Further, when the intermediate bus bar 13 is pushed with the force equal to or greater than the predetermined value, the second support 11c is elastically deformed so that the intermediate bus bar 13 is further press-fit into the accommodation groove 11b. Then, the lower end of the intermediate bus bar 13 is brought into contact with the bottom of the accommodation groove 11b, and the intermediate bus bar 13 is supported at the second position (see FIG. 5C). Here, a pair of recesses 134 are formed on both side surfaces of the intermediate bus bar 13. Thus, when the intermediate bus bar 13 is supported at the second position, the second support 11c engages with the recess 134, so that the support of the intermediate bus bar 13 at the second position is suppressed or prevented from being released.

When the intermediate bus bar 13 is supported at the first position, a position of the intermediate bus bar 13 may be determined by being pressed with the force equal to or greater than the predetermined value, and the determination of the position of the intermediate bus bar 13 is further facilitated by bringing the intermediate bus bar 13 into contact with a portion of the mounting portion 11a as shown in FIGS. 5A to 5C. Alternatively, a mark for determining the position corresponding to the first position of the intermediate bus bar 13 may be provided on another part (for example, on the insulator 11 or the like), and then the intermediate bus bar 13 may be press-fit into accommodation groove 11b on the basis of the position of the mark. In this manner, the determination of the position of the intermediate bus bar 13 is further facilitated.

As described above, at least one of the intermediate bus bar 13 and the mounting portion 11a may have a support capable of supporting the intermediate bus bar 13 at the first position spaced apart from the coil 12 in the axial direction. The support includes at least one of the first support 132 provided on the intermediate bus bar 13 and the second support 11c provided on the mounting portion 11a. In addition, at least one of the first support 132 and the second support 11c is deformed by an action of the force equal to or greater than the predetermined value, so that the intermediate bus bar 13 is supported at the first position with a force less than the predetermined value. Thus, for example, when the coil 12 is installed on the stator core 10, the intermediate bus bar 13 is temporarily fixed at the first position, so that a winding process, which will be described below, in which the coil 12 is installed by winding the conducting wire 12a is facilitated. Further, after the coil 12 is installed, the intermediate bus bar 13 may be fixed at the second position by applying the force equal to or greater than the predetermined value and deforming the protrusion. Thus, the intermediate bus bar 13 may be suppressed from protruding in the axial direction without reducing the workability of the winding process of the coil 12, thereby contributing to miniaturization of the stator 1.

The press-fit part 133 is a part notched from a center of an upper end of the main body 130 of the intermediate bus bar 13. A notch width of the press-fit part 133 at the upper end of the intermediate bus bar 13 gradually decreases downward from an opening side of the upper end. The minimum notch width is slightly smaller than the thickness of the main-bus bar 121 fixed to the press-fit part 133. Thus, the main-bus bar 121 is fixed to the press-fit part 133 by being press-fit into the press-fit part 133. The intermediate bus bar 13 is electrically connected to the main-bus bar 121 by a press-fit structure of the press-fit part 133 and the main-bus bar 121.

Further, the intermediate bus bar 13 includes a first intermediate bus bar 13a connected to the first terminal between the U-phase coils U1 to U4 and the W-phase coils W1 to W4, a second intermediate bus bar 13b connected to the second terminal between the V-phase coils V1 to V4 and the U-phase coils U1 to U4, and a third intermediate bus bar 13c connected to the third terminal between the W-phase coils W1 to W4 and the V-phase coils V1 to V4. In addition, as will be described below, the first terminal is, for example, a connection wire 12b-1. The second terminal is, for example, a connection wire 12b-2. The third terminal is, for example, a connection wire 12b-3. Alternatively, the first terminal may be, for example, a first connection part in which one end Uin of the U-phase coils U1 to U4 and the other end Wout of the W-phase coils W1 to W4 are connected, the second terminal may be, for example, a second connection part in which one end Vin of the V-phase coils V1 to V4 and the other end Uout of the U-phase coils U1 to U4 are connected, and the third terminal may be, for example, a third connection part in which one end Win of the W-phase coils W1 to W4 and the other end Vout of the V-phase coils V1 to V4 are connected. These will be described below.

Figure 6:
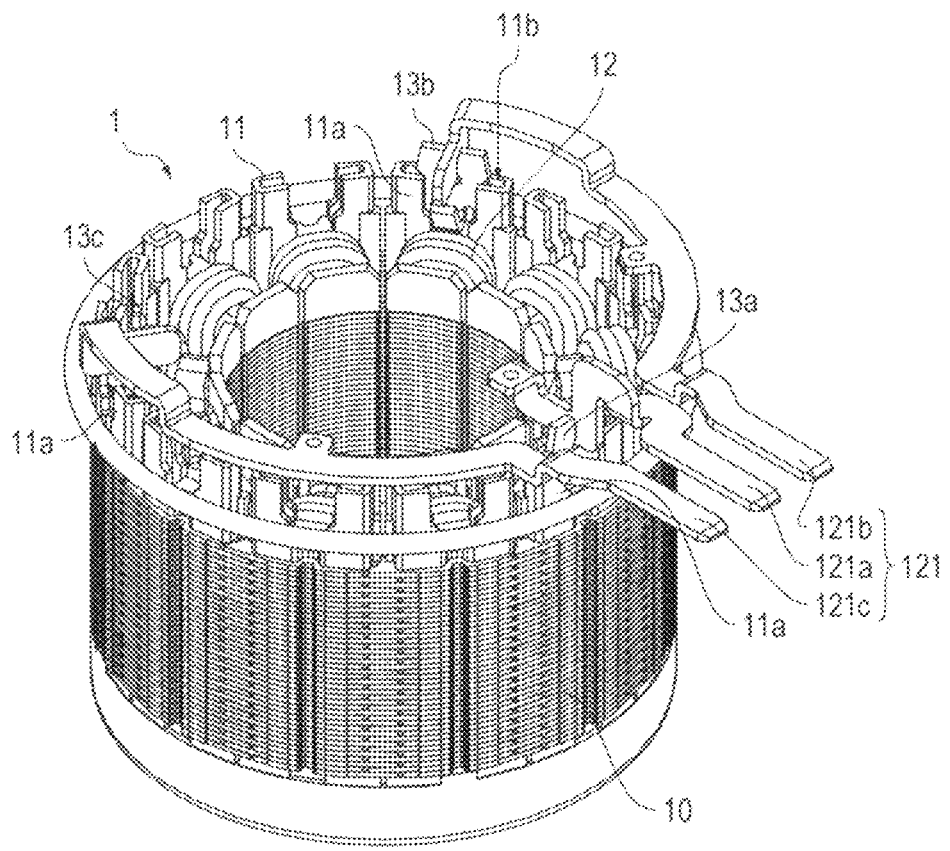
FIG. 6 is a perspective view illustrating an example of a press-fit structure of a main-bus bar and the intermediate bus bar.

Next, the configuration of the bus bar unit 120 will be described with reference to FIG. 6. The motor 100 includes the main-bus bar 121. The driving current is supplied to the stator 1 from an external power supply (not shown) through the main-bus bar 121. More specifically, the main-bus bar 121 is press-fit into the press-fit part 133 of the intermediate bus bar 13 and electrically connected to each coil 12 of the stator 1 through the intermediate bus bar 13 by the press-fit structure, thereby supplying the driving current to each coil 12. FIG. 6 is a perspective view illustrating an example of the press-fit structure of the main-bus bar 121 and the intermediate bus bar 13. As shown in FIG. 6, the main-bus bar 121 includes a first main-bus bar 121a, a second main-bus bar 121b, and a third main-bus bar 121c. The first main-bus bar 121a is press-fit into the press-fit part 133 of the first intermediate bus bar 13a and electrically connected to the first intermediate bus bar 13a. The second main-bus bar 121b is press-fit into the press-fit part 133 of the second intermediate bus bar 13b and electrically connected to the second intermediate bus bar 13b. The third main-bus bar 121c is press-fit into the press-fit part 133 of the third intermediate bus bar 13c and electrically connected to the third intermediate bus bar 13c. In this manner, the stator 1 may be electrically connected to a controller, which controls the motor 100 by supplying the driving current to the stator 1, by the press-fit structure of the intermediate bus bar 13 and the main-bus bar 121.

Further, the present disclosure is not limited to the example described in FIG. 6, and the main-bus bar 121 may include the press-fit part 133, and the intermediate bus bar 13 may be press-fit into the press-fit part 133. That is, the intermediate bus bar 13 may be electrically connected to the main-bus bar 121 by press-fitting one of the intermediate bus bar 13 and the main-bus bar 121 into the other one.

Further, the main-bus bar 121 may be the same member as the intermediate bus bar 13. That is, the first main-bus bar 121a may be the same member as the first intermediate bus bar 13a, the second main-bus bar 121b may be the same member as the second intermediate bus bar 13b, and the third main-bus bar 121c may be the same member as the third intermediate bus bar 13c. Even in such a configuration, the stator 1 may be electrically connected to the controller that controls the motor 100 by supplying the driving current to the stator 1, like in the above-described press-fit structure.

In addition, a conductive wiring member may be used instead of the main-bus bar 121.

Referring back to FIG. 1, the motor 100 includes the bus bar holder 122 made of resin. The bus bar holder 122 holds the main-bus bar 121 and the substrate 123. In addition, the bus bar holder 122 holds a sub-bus bar (not shown) further included in the bus bar unit 120. The sub-bus bar is electrically connected to the substrate 123 and connects the substrate 123 to an external circuit, device, or the like. In the bus bar unit 120, the main-bus bar 121 and the sub-bus bar are insert-molded in the bus bar holder 122. The bearing holder 126 is formed when the bus bar holder 122 is molded. Further, the illustration of the bus bar holder 122 is omitted in FIG. 6 to make the configuration of the main-bus bar 121 and the intermediate bus bars 13a to 13c easy to understand.

The motor 100 includes the substrate 123. The substrate 123 is, for example, a circuit board made of resin on which electronic components are mounted. A sensor (not shown) such as a Hall device for detecting the rotational position of a sensor magnet (not shown) that rotates together with the rotor 102 is mounted on the substrate 123.

The motor 100 includes the second bearing 125. The second bearing 125 rotatably supports the shaft 101 in an upper portion of the motor 100 in the axial direction. When viewed in the axial direction, the bearing holder 126 is installed on a central part of the bus bar holder 122 centered on the central axis CA. The second bearing 125 is held on an inner side surface of the bearing holder 126 in the radial direction.

The motor 100 includes the bracket 129. The bracket 129 is mounted on an upper end of the bus bar holder 122 in the axial direction. The bracket 129 is made of metal but may be made of resin.

The above-described motor 100 includes the rotor 102 rotatable about the central axis CA extending in the vertical direction, and the stator 1 facing the rotor 102 in the radial direction and driving the rotor 102. The stator 1 includes the stator core 10 disposed about the central axis CA, the insulator 11 covering the stator core 10, the plurality of coils 12 installed on the stator core 10 through the insulator 11, and the intermediate bus bar 13 electrically connected to a portion of the conducting wire 12a constituting the coils 12. The intermediate bus bar 13 includes the holder 131 electrically connected to the conducting wire 12a. The insulator 11 includes the mounting portion 11a on which the intermediate bus bar 13 is mounted. At least one of the intermediate bus bar 13 and the mounting portion 11a includes a support capable of supporting the intermediate bus bar 13 at the first position spaced apart from the coil 12 in the axial direction. The mounting portion 11a fixes the intermediate bus bar 13 at the second position between the first position and the coil 12 in the axial direction.

According to the above-described motor 100, the intermediate bus bar 13 mounted on the mounting portion 11a of the insulator 11 is supported at the first position by the support (for example, the first support 132 and the second support 11c) before the winding process is started. Therefore, the winding process in which the coil 12 is installed on the stator core 10 may be easily performed without being interrupted by the intermediate bus bar 13 at the first position further spaced apart from the coil 12 than the second position. In addition, the intermediate bus bar 13 mounted on the mounting portion 11a is fixed at the second position between the first position and the coil 12 after the winding process is completed. Thus, the intermediate bus bar 13 may be suppressed from protruding in the axial direction without reducing the workability of the winding process of the coil 12, thereby contributing to miniaturization of the stator 1.

Figure 7:
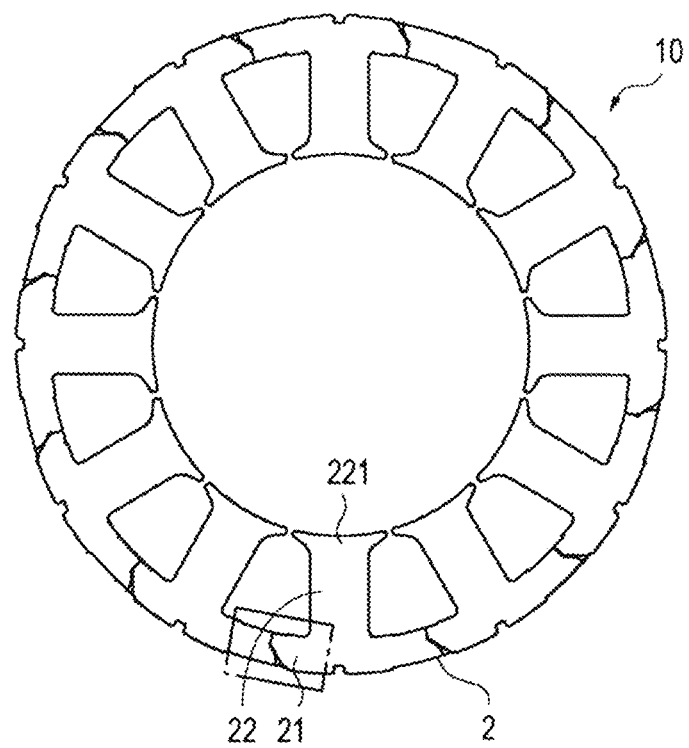
FIG. 7 is a top view of a laminated core piece disposed in a circumferential direction.
Figure 8:
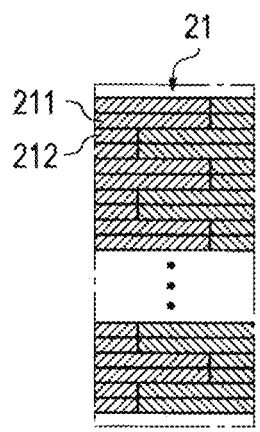
FIG. 8 is a partially enlarged view of connected portions of adjacent laminated core pieces when viewed in a radial direction.
Figure 9:
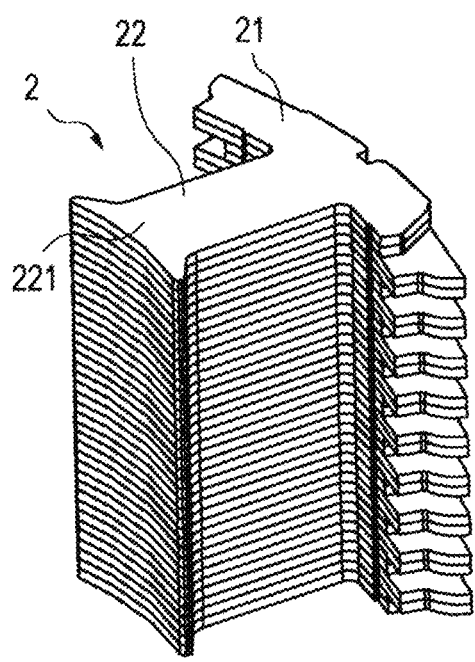
FIG. 9 is a perspective view of the laminated core piece.
Figure 10:
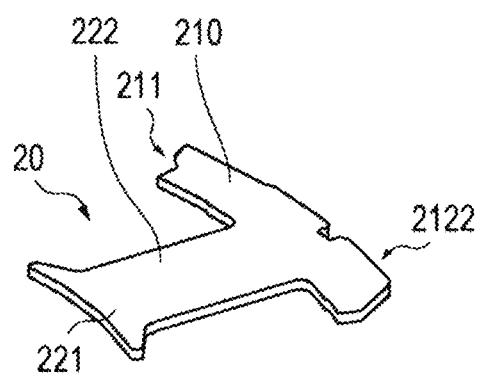
FIG. 10 is a perspective view of a core piece.

Next, the laminated core piece 2 will now be described. Each of the laminated core pieces 2 is an iron core member composed of laminated steel plates in which core pieces 20 formed of, for example, electromagnetic steel plates are laminated in the axial direction. FIG. 7 is a top view of the laminated core piece 2 disposed in an annular shape. FIG. 8 is a partially enlarged view of connected portions of the adjacent laminated core pieces 2 when viewed in the radial direction. FIG. 9 is a perspective view of the laminated core piece 2. FIG. 10 is a perspective view of the core piece 20. Further, FIG. 8 corresponds to a structure in which surrounding portions of a one-dot chain line in FIG. 7 are viewed in the radial direction.

As shown in FIG. 7, the plurality of laminated core pieces 2 are disposed in an annular shape about the central axis CA in the stator 1. The plurality of laminated core pieces 2 are separate members in the present example embodiment and are not directly connected to each other. In addition, although the number of the plurality of laminated core pieces 2 is 12 in the present example embodiment, the number is not limited to this example, and a plural number other than 12 may be used.

Each of the laminated core pieces 2 includes the core back 21 and the tooth portion 22. The tooth portion 22 extends inward in the radial direction from the core back 21. An inner side of the tooth portion 22 in the radial direction includes tooth protrusions 221 protruding at both ends in the circumferential direction. The conducting wire 12a is wound around the tooth portion 22 through the insulator 11. The core back 21 has an arc-shape and extends to one end side and the other end side in the circumferential direction.

Each of the core pieces 20 includes a core back piece 210 constituting the core back 21 and a tooth piece 222 constituting the tooth portion 22. The tooth piece 222 extends inward in the radial direction from core back piece 210. An inner side of the tooth piece 222 in the radial direction includes tooth piece protrusions 221 protruding to both sides in the circumferential direction. The core back piece 210 has an arc-shape and extends to one side and the other side in the circumferential direction. Hereinafter, an end of the core back piece 210 extending to one side in the circumferential direction is referred to as a first core back piece end 211, and an end of the core back piece 210 extending to the other side in the circumferential direction is referred to as a second core back piece end 212. In each of the core pieces 20, the length of the first core back piece end 211 in the circumferential direction from a center line of the tooth piece 222 in the circumferential direction is greater than that of the second core back piece end 212.

When the laminated core piece 2 is formed by laminating the plurality of core pieces 20, the first core back piece end 211 and the second core back piece end 212 are arranged in opposite directions for every two layers of the core pieces 20 in the circumferential direction (see FIG. 9). In addition, the present disclosure is not limited to this example, and the first core back piece end 211 and the second core back piece end 212 may be arranged in opposite directions for every one or three or more layers of the core pieces 20. Also, the core pieces 20 may be laminated in opposite directions for every one layer or plural layers, the core piece 20 punched out from the electromagnetic steel plate may be reversed in the opposite direction, or the core pieces 20 may be laminated without punching and reversing the electromagnetic steel plate in the opposite direction.

The adjacent laminated core pieces 2 are connected to each other at ends of the core back piece 210 in the circumferential direction. That is, a first edge of the core back piece 210 of the core piece 20 constituting one laminated core piece 2 of the adjacent laminated core pieces 2 and a second edge of the core back piece 210 of the core piece 20 constituting the other laminated core piece 2 of the adjacent laminated core pieces 2 alternately overlap each other every two layers in the laminating direction of the core pieces 20 (see FIG. 8). Further, the first edge is the first core back piece end 211 extending from the core back piece 210 of the one laminated core piece 2 toward the other laminated core piece 2 in the circumferential direction. Also, the second edge is the second core back piece end 212 extending from the core back piece 210 of the other laminated core piece 2 toward the one laminated core piece 2 in the circumferential direction. As shown in FIG. 8, by alternately overlapping the first edge and the second edge in the adjacent laminated core pieces 2, the adjacent laminated core pieces 2 are connected to each other to form a connected core 2a in which the plurality of laminated core pieces 2 are connected in a line.

Next, an example of a delta-connection of the coils 12 according to the present example embodiment will be described.

Figure 11A:
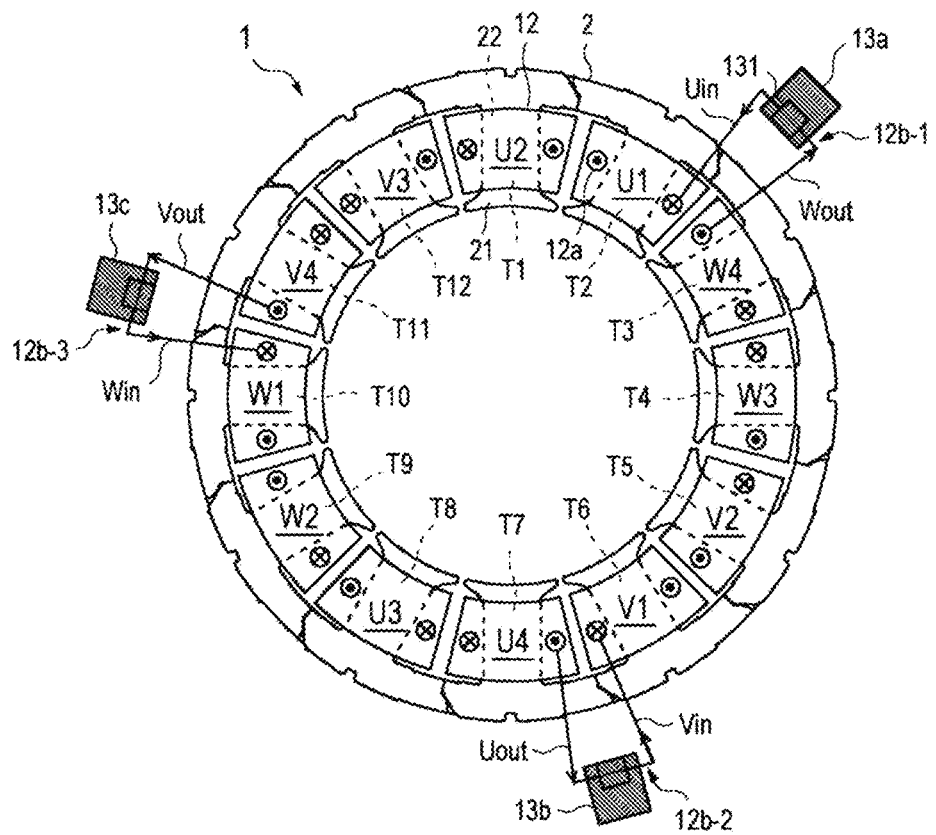
FIG. 11A is a first schematic diagram for describing a method of winding a conducting wire on a stator core in a stator.
Figure 11B:
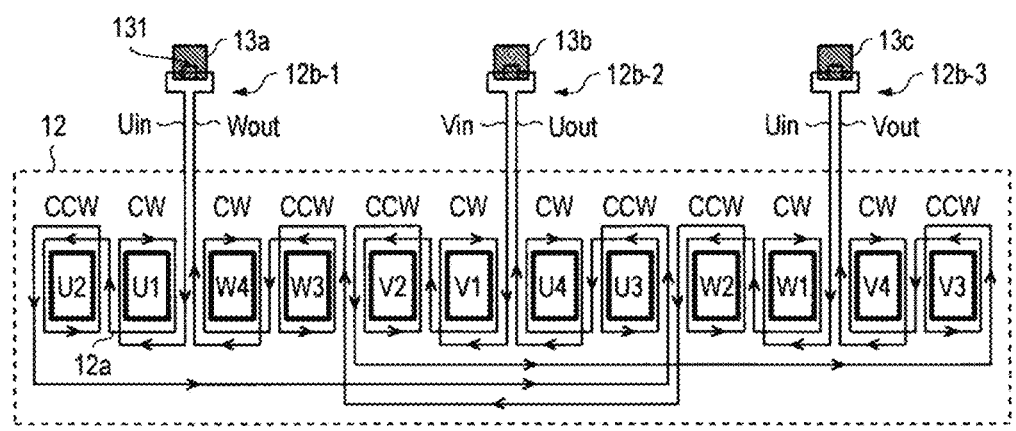
FIG. 11B is a second schematic diagram for describing the method of winding the conducting wire on the stator core.
Figure 12:
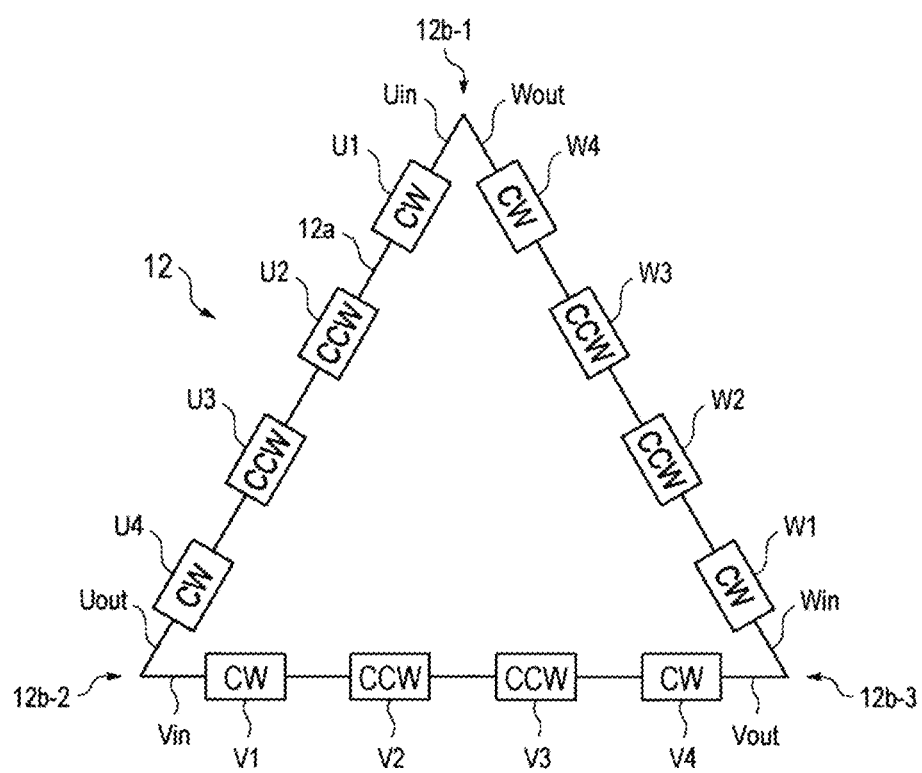
FIG. 12 is a third schematic view illustrating a delta-connection of coils of each phase.

FIG. 11A is a first schematic diagram for describing a method of winding the conducting wire 12a on the stator core 10 in the stator 1. FIG. 11B is a second schematic diagram for describing the method of winding the conducting wire 12a on the stator core 10. FIG. 12 is a third schematic view illustrating the delta-connection of the coils 12 of each phase.

Further, FIG. 11A is a schematic view of the stator 1 when viewed from the top in the axial direction, and FIG. 11B is a schematic view of each of the coils 12 when viewed from the outside in the radial direction. Further, the stator core 10 composed of the plurality of laminated core pieces 2, and each of the coils 12 are shown in FIG. 11A, but the insulator 11 and the intermediate bus bar 13 are omitted in FIG. 11A to make the drawing easy to understand. In addition, the coils 12 of each phase viewed from an inner side in the radial direction are shown in FIG. 11B as being arranged in a straight line for convenience. Further, in the stator 1 of FIG. 11A, hereinafter, a clockwise direction viewed from the inner side in the radial direction is referred to as a "clockwise (CW)", and a counterclockwise direction viewed from the inner side in the radial direction is referred to as a "counterclockwise (CCW)". In addition, in the stator core 10, a plurality of tooth portions 22 of the laminated core piece 2 arranged clockwise in the circumferential direction are referred to as tooth portions T1 to T12, respectively.

Twelve coils 12 include four U-phase coils U1 to U4, four V-phase coils V1 to V4, and four W-phase coils W1 to W4. In a plan view viewed from the top in the axial direction, as shown in FIG. 11A, two coils 12 of each phase are installed on the stator core 10 in the circumferential direction in a plan view viewed from the top in the axial direction. Specifically, in a clockwise order in the circumferential direction, a U-phase coil U2, a U-phase coil U1, a W-phase coil W4, a W-phase coil W3, a V-phase coil V2, a V-phase coil V1, a U-phase coil U4, a U-phase coil U3, a W-phase coil W2, a W-phase coil W1, a V-phase coil V4, and a V-phase coil V3 are installed. The U-phase coils U1 to U4, the V-phase coils V1 to V4, and the W-phase coils W1 to W4 are each formed of one conducting wire 12a.

That is, first, the U-phase conducting wire 12a is wound around a tooth portion T2 of the laminated core piece 2 in the CW direction, in a state in which the one end Uin is left as one lead wire, to form the U-phase coil U1. The conducting wire 12a of which the U-phase coil U1 has been formed is wound in the CCW direction around an adjacent tooth portion T1 in the counterclockwise direction in the circumferential direction to form the U-phase coil U2. The conducting wire 12a of which the U-phase coil U2 has been formed is wound in the CCW direction around a tooth portion T8 at a position away from the U-phase coil U2 in the circumferential direction to form the U-phase coil U3. The conducting wire 12a of which the U-phase coil U3 has been formed is wound in the CW direction around an adjacent tooth portion T7 in the counterclockwise direction in the circumferential direction to form the U-phase coil U4. The other end Uout of the conducting wire 12a of which the U-phase coil U4 has been formed becomes the other lead wire.

Further, first, the V-phase conducting wire 12a is wound around a tooth portion T6 of the laminated core piece 2 in the CW direction, in a state in which the one end Vin is left as one lead wire, to form the V-phase coil V1. The conducting wire 12a of which the V-phase coil V1 has been formed is wound in the CCW direction around an adjacent tooth portion T5 in the counterclockwise direction in the circumferential direction to form the V-phase coil V2. The conducting wire 12a of which the V-phase coil V2 has been formed is wound in the CCW direction around a tooth portion T12 at a position away from the V-phase coil V2 in the circumferential direction to form the V-phase coil V3. The conducting wire 12a of which the V-phase coil V3 has been formed is wound in the CW direction around an adjacent tooth portion T11 in the counterclockwise direction in the circumferential direction to form the V-phase coil V4. The other end Vout of the conducting wire 12a of which the V-phase coil V4 has been formed becomes the other lead wire.

Further, first, the W-phase conducting wire 12a is wound around a tooth portion T10 of the laminated core piece 2 in the CW direction, in a state in which the one end Win is left as one lead wire, to form the W-phase coil W1. The conducting wire 12a of which the W-phase coil W1 has been formed is wound in the CCW direction around an adjacent tooth portion T9 in the counterclockwise direction in the circumferential direction to form the W-phase coil W2. The conducting wire 12a of which the W-phase coil W2 has been formed is wound in the CCW direction around a tooth portion T4 at a position away from the W-phase coil W2 in the circumferential direction to form the W-phase coil W3. The conducting wire 12a of which the W-phase coil W3 has been formed is wound in the CW direction around an adjacent tooth portion T3 in the counterclockwise direction in the circumferential direction to form the W-phase coil W4. The other end Wout of the conducting wire 12a of which the W-phase coil W4 has been formed becomes a lead line of the other side.

Further, the coils 12 of each phase are formed by one conducting wire 12a, as shown in FIG. 12. That is, the U-phase conducting wire 12a, the V-phase conducting wire 12a, and the W-phase conducting wire 12a are the same conducting wire 12a.

More specifically, the one end Uin, which is one lead wire of the U-phase, and the other end Wout, which is the other lead wire of the W-phase, are connected to each other through the connection wire 12b-1 as the same conducting wire 12a. As shown in FIG. 11B, the connection wire 12b-1 is held by the holder 131 of the first intermediate bus bar 13a and electrically connected to the first intermediate bus bar 13a.

Further, the one end Vin, which is one lead wire of the V-phase, and the other end Uout, which is the other lead wire of the U-phase, are connected to each other through the connection wire 12*b*-2 as the same conducting wire 12*a*. As shown in FIG. 11B, the connection wire 12*b*-2 is held by the holder 131 of the second intermediate bus bar 13*b* and electrically connected to the second intermediate bus bar 13*b*.

Further, the one end Win, which is one lead wire of the W-phase, and the other end Vout, which is the other lead wire of the V-phase, are connected to each other through the connection wire 12*b*-3 as the same conducting wire 12*a*. As shown in FIG. 11B, the connection wire 12*b*-3 is held by the holder 131 of the third intermediate bus bar 13*c* and electrically connected to the third intermediate bus bar 13*c*.

Further, the present disclosure is not limited to the example of FIG. 11B and FIG. 12, the coils 12 of each phase may not be formed by one conducting wire 12*a*. That is, the conducting wire 12*a* forming the U-phase coils U1 to U4, the conducting wire 12*a* forming the V-phase coils V1 to V4, and the conducting wire 12*a* forming the W-phase coils W1 to W4 may be different conducting wires. Further, the one end Uin and the other end Wout may be directly held by the holder 131 of the first intermediate bus bar 13*a* and electrically connected to the first intermediate bus bar 13*a*. Likewise, the one end Vin and the other end Uout may be directly held by the holder 131 of the second intermediate bus bar 13*b* and electrically connected to the second intermediate bus bar 13*b*. Also, the one end Win and the other end Vout may be directly held by the holder 131 of the third intermediate bus bar 13*c* and electrically connected to the third intermediate bus bar 13*c*.

Figure 13:
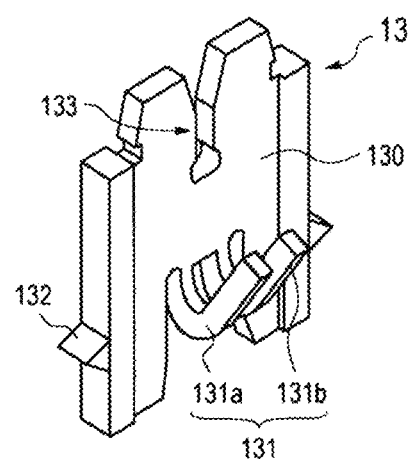

Further, in each of the intermediate bus bars 13*a* to 13*c*, the one end Uin, Vin, or Win of each phase and the other end Uout, Vout, or Wout of each phase may be held by the different holders 131. FIG. 13 is a perspective view illustrating another configuration example of the intermediate bus bar 13. As shown in FIG. 13, in each of the intermediate bus bars 13*a* to 13*c*, the holder 131 may have a first holder 131*a* and a second holder 131*b* that individually connect a plurality of conducting wires 12*a*. In addition, a first conducting wire 12*a* (that is, one end Uin, Vin, or Win of each phase) may be connected to the first holder 131*a*, and a second conducting wire 12*a* (that is, the other end Uout, Vout, or Wout) may be connected to the second holder 131*b*.

For example, in each of the intermediate bus bars 13*a* to 13*c*, when the one end Uin, Vin, or Win and the other end Uin, Vin, or Win are connected to one intermediate bus bar 13, both may be held by one holder 131 and connected to the intermediate bus bar 13. However, when the second conducting wire 12*a* (the other end Uin, Vin, or Win) is held by the holder 131 which already holds the first conducting wire 12*a* (for example, the one end Uin, Vin, or Win) using a winding machine, a nozzle of the winding machine interferes with the first conducting wire 12*a* already connected to the holder 131 to make the work of winding the second conducting wire 12*a* difficult. On the other hand, when the first conducting wire 12*a* is held by the first holder 131*a*, and the second conducting wire 12*a* is held by the second holder 131*b*, the above-described inconvenience may be avoided.

Next, an example of a method of manufacturing a stator 1 will be described. The manufacturing method of the stator 1, in which a plurality of laminated core pieces 2 in which a tooth portion 22 extends in a radial direction from a core back 21, are arranged about a central axis CA in an annular shape, includes a piece forming process, a laminating process, a holding process, an insulator coating process, a mounting process, a winding process, and a ring-shape forming process.

In the piece forming process, a plurality of core pieces 20 having a plate shape (see FIG. 10) are individually formed by, for example, punching an electromagnetic steel plate.

Figure 14:
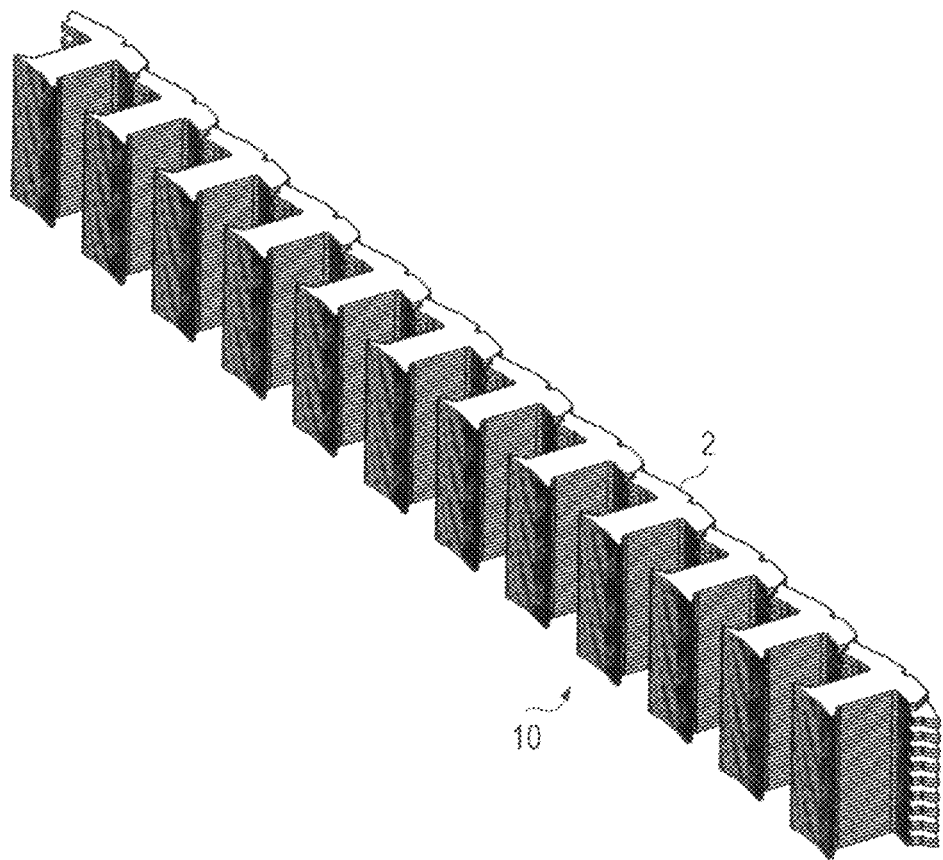
FIG. 14 is a perspective view for describing an example of a core connecting process.

The laminating process includes a piece laminating process and a core connecting process. In the piece laminating process, the plurality of core pieces 20 are laminated to form the laminated core piece 2. In the core connecting process, as shown in FIG. 14, the plurality of laminated core pieces 2 are connected in one connection forming a straight line in a bendable manner, wherein in each of the plurality of laminated core pieces 2, the tooth 22 extends in the radial direction from the core back 21. A connected core 2*a* is formed by this process. More specifically, in the laminating process, a first edge of a core back piece 210 of the core piece 20 constituting one laminated core piece 2 of the adjacent laminated core pieces 2 in series and a second edge of the core back piece 210 of the core piece 20 constituting the other laminated core piece 2 of the adjacent laminated core pieces 2 in series alternately overlap each other every two layers in a laminating direction of the core pieces 20 (see FIG. 8).

Further, the first edge is a first core back piece end 211 extending toward the other laminated core piece 2 in the circumferential direction in one laminated core piece 2. In addition, the second edge is a second core back piece end 212 extending toward the one laminated core piece 2 in the circumferential direction in the other laminated core piece 2. In this manner, the adjacent laminated core pieces 2 may be connected to each other by alternately overlapping the first edge and the second edge of the adjacent laminated core pieces 2 in the laminating direction. Thus, the stator core 10 having a straight shape in which the plurality of laminated core pieces 2 are connected to each other in one connection may be formed.

The piece forming process, the piece laminating process, and the core connecting process may be simultaneously performed in the laminating process. That is, in the piece forming process, the plurality of core pieces 20 constituting the same layer are punched so as to be arranged in a straight line. Thereafter, the plurality of core pieces 20 constituting the next layer in which the first core back piece end 211 is in the opposite direction to the second core back piece end 212 are punched so as to be arranged in a straight line. By repeating this process for the number of laminates, the straight stator core 10 may be formed in which the plurality of laminated core pieces 2 shown in FIG. 14 are connected in a straight line.

In the straight stator core 10 in which the plurality of laminated core pieces 2 are connected in one connection, a separation distance between adjacent tooth portions 22 is greater than a separation distance between adjacent tooth portions 22 when the laminated core pieces 2 are disposed in an annular shape.

In the holding process, each of the laminated core pieces 2 is held by a fixing jig (not shown) of the winding machine. By this process, the stator core 10 in a straight shape is held by the winding machine.

Figure 15:
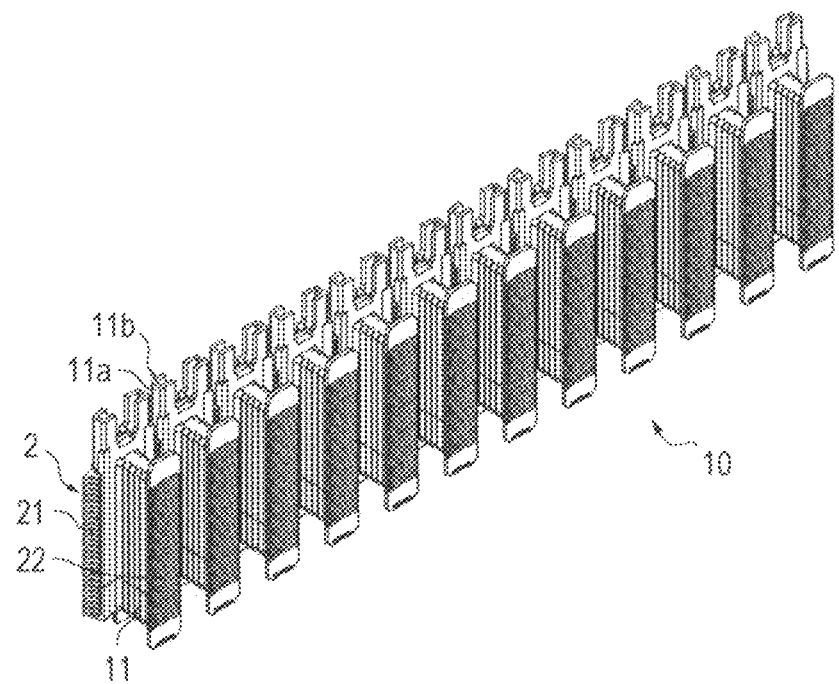
FIG. 15 is a perspective view for describing an example of an insulator coating process.

In the insulator coating process, at least a portion of each of the laminated core pieces 2 is covered with an insulator 11. The insulator 11 is fitted from upper and lower sides of the stator core 10 in an axial direction and covers surfaces of the stator core 10 excluding an inner side surface of the tooth portion 22 and an outer side surface of the core back 21. A mounting portion 11*a* having an accommodation groove 11*b* is also formed on the insulator 11 as shown in FIG. 15. Although a plurality of mounting portions 11*a* are formed corresponding to all the plurality of core backs 21, the above-described intermediate bus bar 13 is mounted on three mounting portions 11a in the example of FIG. 15.

Subsequently, the mounting process and the winding process are performed. In the mounting process, the intermediate bus bar 13 is mounted on the mounting portion 11a of the insulator 11. Further, the mounting process includes a supporting process performed before the start of the winding process, and a fixing process performed after the completion of the winding process. Further, in the winding process, the coils 12 of each phase are installed on the stator core 10 through the insulator 11 using the winding machine.

Figure 16:
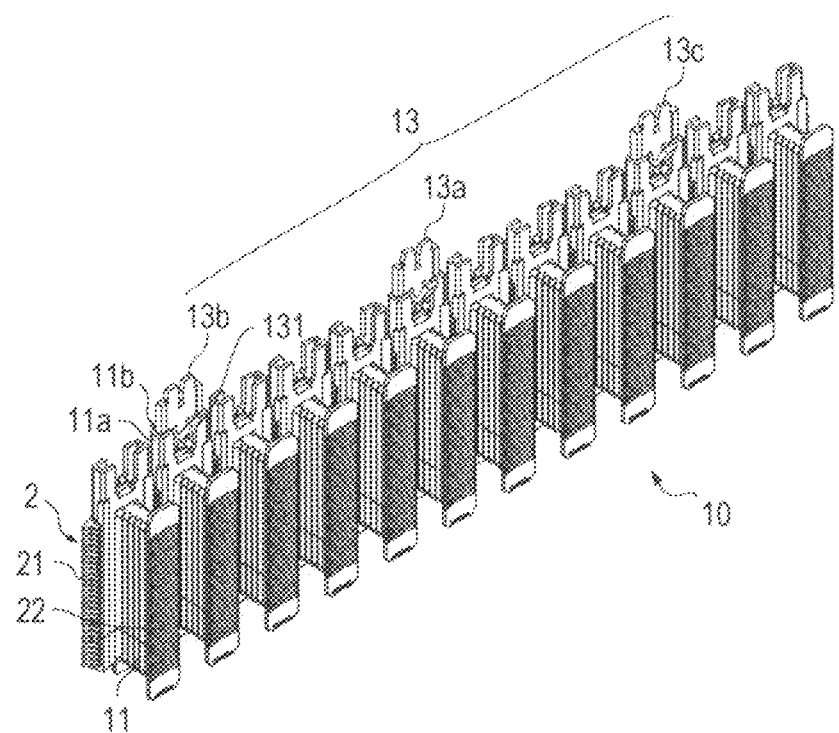
FIG. 16 is a perspective view for describing an example of a supporting process.

Specifically, first, the supporting process is performed before the start of the winding process. In the supporting process, the intermediate bus bar 13 is inserted into the accommodation groove 11b as shown in FIG. 16. However, in the supporting process, the intermediate bus bar 13 is supported at a first position spaced apart from the coil 12 in the mounting portion 11a in the axial direction by the action of the support (for example, the first support 132 or the second support 11c).

Subsequently, in the winding process, the process of winding a conducting wire 12a through the insulator 11 using the winding machine is performed in a state in which the adjacent tooth portions 22 are separated from each other. Thus, the coil 12 is installed on each tooth portion 22. In this manner, since the adjacent tooth portions 22 are separated from each other, the winding nozzle of the winding machine does not interfere with the adjacent tooth portions 22. Thus, the work of installing the coils 12 on the tooth portions 22 of each of the laminated core pieces 2 is facilitated. Thereby, the coils 12 may be wound in order to increase the space factor of the coils 12. In addition, it is also easy to automate the process of installing the coils 12.

Further, in the winding process, the coils 12 may be installed in a state in which the laminated core pieces 2 are arranged in an arc or annular shape, and each tooth portion 22 extends outward in the radial direction from the core back 21. In this manner, since it is possible to widen the separation distance between the adjacent tooth portions 22, it is difficult for the adjacent tooth portions 22 to disturb during the installation of the coils 12. Thus, the work of installing the coils 12 on the tooth portions 22 of each of the laminated core pieces 2 is facilitated.

Further, in the winding process, each coil 12 installed in the plurality of laminated core pieces 2 is delta-connected using, for example, one conducting wire 12a. That is, U-phase coils U1 to U4, V-phase coils V1 to V4, and W-phase coils W1 to W4 having different electrical phases are delta-connected through connection wires 12b-1, 12b-2, and 12b-3, respectively. The conducting wire 12a drawn out from the winding nozzle rotates about the tooth portion 22, thereby winding the coil 12 around the tooth portion 22. Here, the conducting wire 12a is wound through the holder 131 as well, so that the connection wire 12b-1 is held by a holder 131 of a first intermediate bus bar 13a. After the work of winding all the coils 12 is completed, a predetermined electrode tool (not shown) is energized while pressing the holder 131 and a main body 130. The contact portions of the holder 131, the main body 130, and the conducting wire 12a are melted and bonded. Here, an insulating coating of the conducting wire 12a is also melted, so that the connection wire 12b-1 is fixed to the first intermediate bus bar 13a and electrically connected to the first intermediate bus bar 13a.

Further, the connection wire 12b-2 is also held by the holder 131 of a second intermediate bus bar 13b, and is fixed to the second intermediate bus bar 13b and electrically connected to the second intermediate bus bar 13b like the connection wire 12b-1.

Further, the connection wire 12b-3 is also held by the holder 131 of a third intermediate bus bar 13c, and is fixed to the third intermediate bus bar 13c and electrically connected to the third intermediate bus bar 13c like the connection wire 12b-1.

As described above, the work of wiring each of the coils 12 is facilitated by delta-connecting the U-phase coils U1 to U4, the V-phase coils V1 to V4, and the W-phase coils W1 to W4 having different electrical phases from each other. Accordingly, the work efficiency may be improved when the coil 12 is installed on each tooth portion 22 of the laminated core piece 2.

Figure 17:
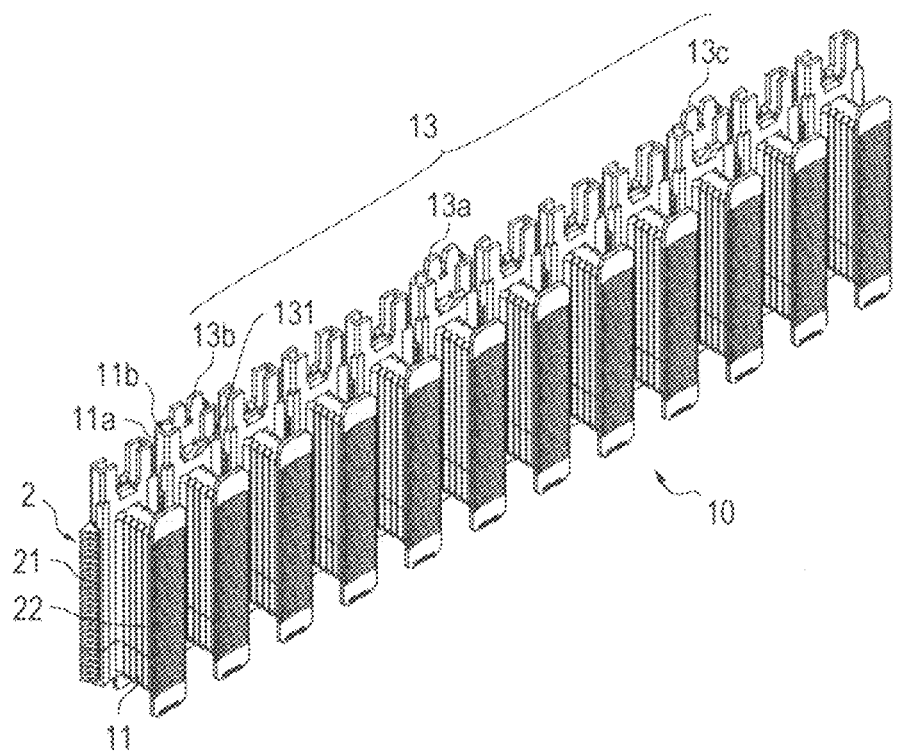
FIG. 17 is a perspective view for describing an example of a fixing process.

After the winding process is completed, the fixing process is performed. FIG. 17 is a perspective view for describing an example of the fixing process. Further, the illustration of each coil 12 (that is, the conducting wire 12a wound around the tooth portion 22) is omitted in FIG. 17 to make the mounting position of the intermediate bus bar 13 easy to see. Further, FIG. 17 illustrates an example of the fixing process in the case in which the winding process is performed in a state in which each of the laminated core pieces 2 is arranged in a straight line, and each tooth portion 22 extends from the core back 21 in the same direction.

In the fixing process, the intermediate bus bar 13 is press-fit into the accommodation groove lib by applying a pressing force equal to or greater than a predetermined value to the intermediate bus bar 13 in the axial direction. As a result, the intermediate bus bar 13 is fixed at a second position between the first position and the coil 12 in the axial direction. In this manner, the size of the stator 1 in the axial direction may be reduced, thereby contributing to miniaturization of the stator 1. In addition, the tension of each connection wire 12b may be loosened by the movement of the intermediate bus bar 13 from the first position to the second position, so that the conducting wire 12a may be difficult to be disconnected in the subsequent ring-shape forming process.

As described above, since the holder 131 of the intermediate bus bar 13 protrudes toward the tooth portion 22, the holder 131 may interfere with the operation of the winding nozzle in the winding process, but in the present example embodiment, the intermediate bus bar 13 is held at the first position and wound in a state of being spaced apart from the coil 12. Thus, the intermediate bus bar 13 does not interfere with the winding process, so that the coil 12 may be easily wound.

FIG. 18 is a perspective view for describing an example of the ring-shape forming process. In the ring-shape forming process, as shown in FIG. 17, the laminated core pieces 2 are arranged in an annular shape in the state having the coils 12 on the straight stator core 10 in which the plurality of laminated core pieces 2 are connected in a straight line, and both ends of the stator core 10 are connected to each other to form the annular-shaped stator core 10 shown in FIG. 18.

Figure 19:
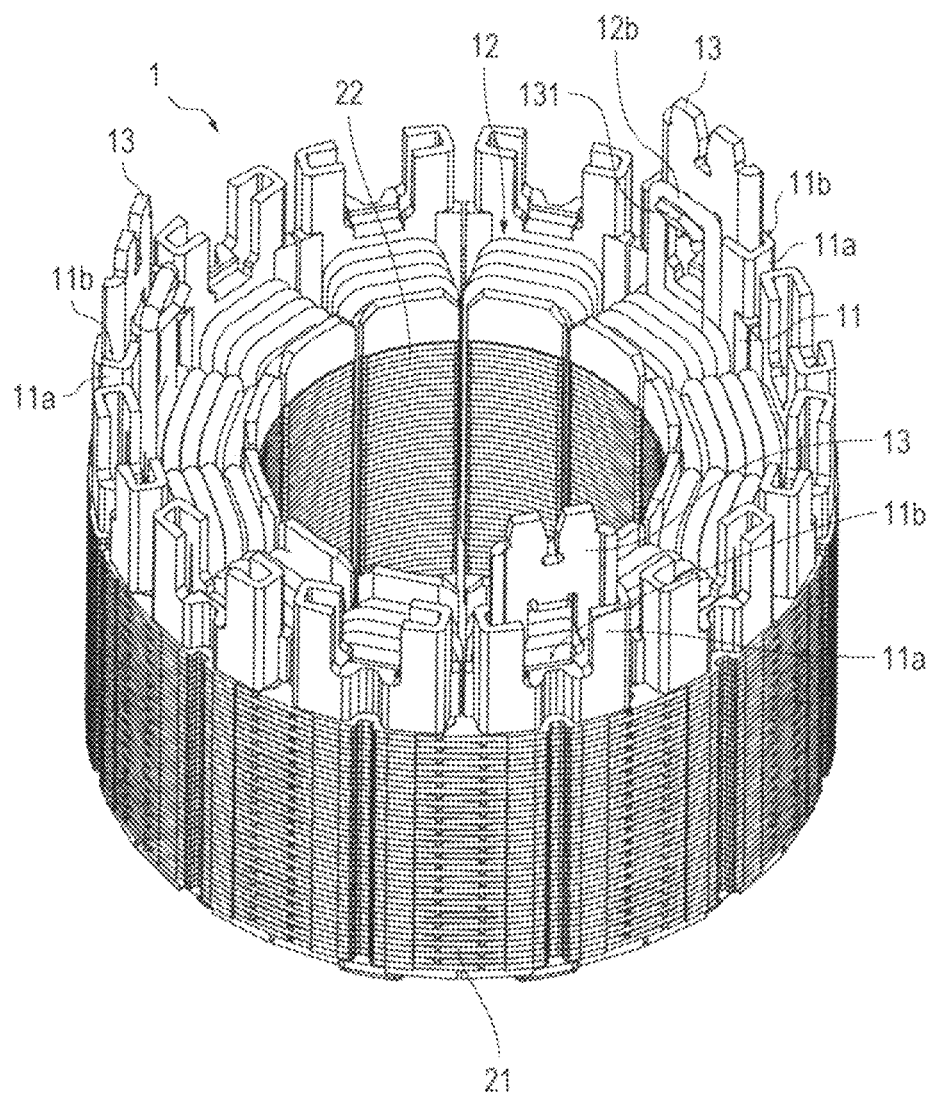
FIG. 19 is a perspective view for describing an example of the ring-shape forming process performed before the supporting process.

Further, the ring-shape forming process is not limited to the above-described example, and may be performed before the fixing process. That is, the intermediate bus bar 13 may be press-fit into the accommodation groove 11b at the second position as shown in FIG. 18 after the connected core 2a is made in an annular shape as shown in FIG. 19.

Example Embodiment

In the piece forming process of the manufacturing process of the stator 1, a plurality of core pieces 20 may be formed in a state of being connected in one connection. Hereinafter, a first modified example of the example embodiment will be described. However, in the first modified example below, configurations different from the above-described example embodiment will be described. In addition, the same configurations as those in the above-described example embodiment may be denoted by the same reference numerals and descriptions thereof may be omitted.

Figure 20:
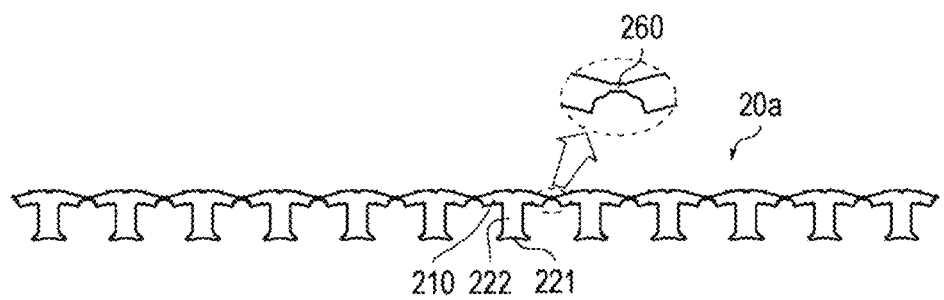
FIG. 20 is a plan view illustrating an example of connected core pieces according to a first modified example of an example embodiment of the present disclosure.

In the first modified example, a plurality of laminated core pieces 2 are formed by laminating connected core pieces 20a connected in series. FIG. 20 is a plan view illustrating an example of the connected core pieces 20a according to the first modified example of the example embodiment. Each of the connected core pieces 20a includes a core back piece 210 constituting a core back 21, a tooth piece 222 constituting a tooth portion 22, and a connection part 260. The connection part 260 connects ends of the adjacent core back pieces 210 to each other in a circumferential direction so as to be bendable.

An example of a method of manufacturing a stator 1 having an annular shape according to the first modified example will be described below.

In the method of manufacturing the stator 1 according to the first modified example, the connected core pieces 20a are formed as shown in FIG. 20 by punching, for example, an electromagnetic steel plate in a piece forming process. In the connected core pieces 20a, a plurality of plate-shaped core pieces 20 in which the tooth piece 222 extends from the core back piece 210, are connected in a straight line through the connection part 260. In addition, in the adjacent core pieces 20, the ends of the core back pieces 210 in the circumferential direction directly connected to each other so as to be bendable. In this manner, the adjacent laminated core pieces 2 may be directly connected to each other in a single stator core 10. Thus, the number of components of the stator 1 included in the motor 100 may be reduced.

In the laminating process, the plurality of plate-shaped core pieces 20 connected in series through the connection part 260 are laminated to form the single stator core 10. In other words, a piece laminating process and a core connecting process are the same process, and ends of the core backs 21 of the adjacent laminated core pieces 2 in the circumferential direction are directly connected to each other so as to be bendable in the core connecting process. In this manner, since the adjacent laminated core pieces 2 may be directly connected to each other, the number of components of the stator 1 may be reduced.

A holding process, an insulator coating process, a mounting process, a winding process, and a ring-shape forming process are the same as those in the above-described example embodiment, and thus the description thereof is omitted.

Example Embodiment

Next, a second modified example of the example embodiment will be described. However, in the second modified example, configurations different from the above-described example embodiment, and the modified example will be described below. In addition, the same configurations as those in the above-described example embodiment and the modified example may be denoted by the same reference numerals and descriptions thereof may be omitted.

Figure 21:
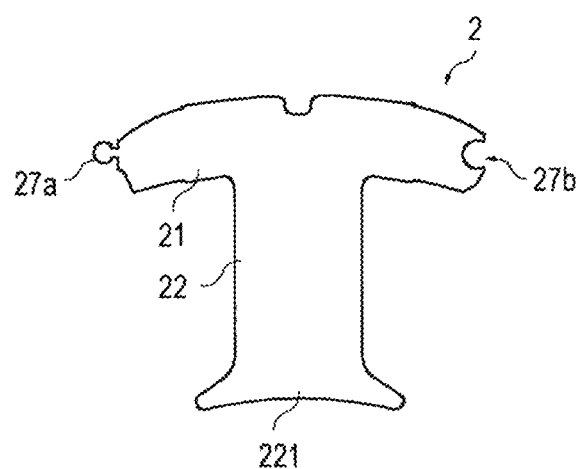
FIG. 21 is a plan view of a laminated core piece according to a second modified example of an example embodiment of the present disclosure.

FIG. 21 is a plan view of a laminated core piece 2 according to the second modified example of the example embodiment. Each laminated core piece 2 includes a first fitting part 27a and a second fitting part 27b. The first fitting part 27a is provided at one end of a core back 21 in a circumferential direction. The second fitting part 27b is provided at the other end of the core back 21 in the circumferential direction, that is, at the end opposite to the first fitting part 27a. The first fitting part 27a of one laminated core piece 2 and the second fitting part 27b of the other laminated core piece 2 are fitted into each other to be rotatable about the laminating direction of the core pieces to connect the adjacent laminated core pieces 2 to each other.

Next, an example of a method of manufacturing a stator 1 having an annular shape according to the second modified example will be described.

In the method of manufacturing the stator 1 according to the second modified example, a plate-shaped core piece 20 constituting the laminated core piece 2 is formed as shown in FIG. 21 by punching, for example, an electromagnetic steel plate in a piece forming process. In addition, a plan view of the core piece 20 is similar to the plan view of the laminated core piece 2 and thus is omitted. A fitting protrusion (not shown) constituting the first fitting part 27a is provided on one end of a core back piece 210 of the core piece 20 in the circumferential direction. In addition, a fitting recess (not shown) constituting the second fitting part 27b is provided on the other end of the core back piece 210 of the core piece 20 in the circumferential direction.

In the laminating process, the laminated core piece 2 shown in FIG. 21 is formed by laminating the core pieces 20 in a piece laminating process. Further, a core connecting process includes a fitting process. In the fitting process, one first fitting part 27a and the other second fitting part 27b of the adjacent laminated core pieces 2 are fitted into each other to be rotatable about the laminating direction of the core pieces 20. The one first fitting part and the other second fitting part of the adjacent laminated core pieces 2 are fitted into each other to connect the adjacent laminated core pieces 2 to each other, and a plurality of laminated core pieces 2 may form a connected core 2a connected in one connection.

A holding process, an insulator coating process, a mounting process, a winding process, and a ring-shape forming process are the same as those in the above-described example embodiment, and thus the description thereof is omitted.

Example Embodiment

A stator core 10 may be an iron core member formed of laminated steel plates in which a plurality of core plates 10a in which an electromagnetic steel plate is punched in an annular shape, are laminated in an axial direction. Hereinafter, a third modified example of the example embodiment will be described. However, in the third modified example, configurations different from the above-described example embodiment and the modified examples will be described below. In addition, the same configurations as those in the above-described example embodiment and the modified examples may be denoted by the same reference numerals and descriptions thereof may be omitted.

Figure 22:
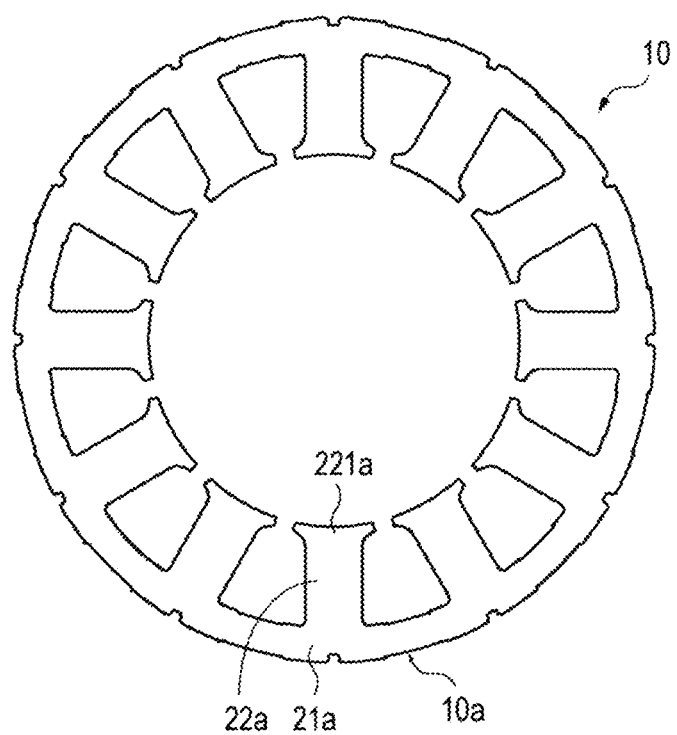
FIG. 22 is a plan view of a stator core according to a third modified example of an example embodiment of the present disclosure.

FIG. 22 is a plan view of the stator core 10 according to the third modified example of the example embodiment. The stator core 10 includes a core back 21a having an annular shape and a plurality of tooth portions 22a extending inward in a radial direction from the core back 21a. Further, each of the tooth portions 22a includes a tooth protrusion 221a. The tooth protrusion 221a protrudes from the tip of the tooth portion 22a in an inner side in the radial direction to both ends in a circumferential direction. Further, although the number of the plurality of tooth portions 22a extending inward in the radial direction is twelve in FIG. 22, the number is not limited to this example, and a plural number other than twelve may be used.

Next, an example of a method of manufacturing a stator 1 having an annular shape according to the third modified example will be described. The method of manufacturing the stator 1 in the third modified example includes a stator core forming process, a holding process, an insulator coating process, a mounting process, a winding process, and a ring-shape forming process.

In the stator core forming process, the stator core 10 (see FIG. 22) is formed in which the plurality of tooth portions 22a extend in the radial direction from the annular-shaped core back 21a. The stator core forming process includes a plate forming process and a plate laminating process. In the plate forming process, a plurality of annular-shaped core plates 10a constituting the stator core 10 are formed, for example, by punching an electromagnetic steel plate. In the plate laminating process, the stator core 10 is formed by laminating the core plates 10a. Further, the plate forming process and the plate laminating process may also be performed simultaneously. That is, the core plates 10a formed by punching the electromagnetic steel plates are punched and laminated simultaneously.

The holding process, the insulator coating process, and the mounting process including a supporting process and a fixing process are the same as those in the above-described example embodiment, and thus the description thereof is omitted.

In the winding process after the supporting process of an intermediate bus bar 13, a winding nozzle of a winding machine is disposed in a central opening of the annular-shaped stator core 10 toward each of the tooth portions 22a. In each of the tooth portions 22a, a conducting wire 12a is wound through a holder 131 by the winding machine. Here, the adjacent tooth protrusions 221a are spaced apart from each other in the circumferential direction to the extent that the winding nozzle of the winding machine is not brought into contact with the tooth protrusion 221a in the winding process. In addition, the intermediate bus bar 13 is supported at a first position spaced apart from a coil 12 in an axial direction in a mounting portion 11a. Thus, the work of installing the coil 12 to each of the tooth portions 22a is easily performed. After the end of the winding process, the intermediate bus bar 13 is pushed into an accommodation groove 11b in the fixing process and supported at a second position.

The ring-shape forming process is the same as that of the above-described example embodiment, and thus the description thereof is omitted.

The present disclosure is useful, for example, for a method of manufacturing a stator in which a conducting wire 12a is wound around a tooth portion 22 (or a tooth portion 22a) using a winding machine, and a motor having the stator.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor comprising:
a rotor rotatable about a central axis extending in a vertical direction; and
an annular stator facing the rotor in a radial direction to drive the rotor; wherein
the stator includes a stator core disposed about the central axis, an insulator covering the stator core, coil portions installed on the stator core through the insulator, and an intermediate bus bar electrically connected to a portion of a conducting wire constituting the coil portions;
the stator includes a core back portion having an arc-shape and a tooth portion extending inward from the core back portion in the radial direction, the intermediate bus bar includes a main body and a holding portion electrically connected to the conducting wire, the insulator includes a mounting portion which corresponds to the core back portion and on which the intermediate bus bar is mounted, at least one of the intermediate bus bar and the mounting portion includes a supporting portion capable of supporting the intermediate bus bar at a first position spaced apart from the coil portions in an axial direction, the mounting portion fixes the intermediate bus bars at a second position between the first position and the coil portions in the axial direction, and the holding portion extends from a lower end of the main body and is bent in a hook shape.

2. The motor of claim 1, wherein the supporting portion includes a first supporting portion installed on the intermediate bus bar, the mounting portion includes an accommodation groove to accommodate at least a portion of the intermediate bus bar, and the first supporting portion is a protrusion elastically abutting an inner side surface of the accommodation groove.

3. The motor of claim 1, wherein the supporting portion includes a second supporting portion installed on the mounting portion, and the second supporting portion is a protrusion elastically abutting the intermediate bus bar.

4. The motor of claim 1, wherein the coil portions include a U-phase coil portion, a V-phase coil portion, and a W-phase coil portion, the U-phase coil portion, the V-phase coil portion, and the W-phase coil portion have different electrical phases from each other and are delta-connected through a connection wire, at least three intermediate bus bars are provided, a first terminal portion between the U-phase coil portion and the W-phase coil portion, a second terminal portion between the V-phase coil portion and the U-phase coil portion, and a third terminal portion between the W-phase coil portion and the V-phase coil portion are connected to the different intermediate bus bars, respectively.

5. The motor of claim 4, wherein the U-phase coil portion, the V-phase coil portion, and the W-phase coil portion, which are delta-connected, are defined by one conducting wire.

6. The motor of claim 4, wherein the connection wire is hooked on the holding portion.

7. The motor of claim 1, wherein the conducting wire is press-fitted into the holding portion.

8. The motor of claim 1, wherein
the holding portion includes a first holding portion and a second holding portion individually connecting a plurality of conducting wires;
the first conducting wire is connected to the first holding portion, and the second conducting wire is connected to the second holding portion.

9. The motor of claim 1, further comprising a main-bus bar through which a driving current is supplied to the stator from an external power source; wherein
    the intermediate bus bar is electrically connected to the main-bus bar as one of the intermediate bus bar and the main-bus bar are pressed-fitted into the other of the intermediate bus bar and the main-bus bar.

10. A motor comprising:
    a rotor rotatable about a central axis extending in a vertical direction; and
    an annular stator facing the rotor in a radial direction to drive the rotor; wherein
    the stator includes a stator core disposed about the central axis, an insulator covering the stator core, coil portions installed on the stator core through the insulator, and an intermediate bus bar electrically connected to a portion of a conducting wire constituting the coil portions;
    the intermediate bus bar includes a holding portion electrically connected to the conducting wire, the insulator includes a mounting portion on which the intermediate bus bar is mounted, at least one of the intermediate bus bar and the mounting portion includes a supporting portion capable of supporting the intermediate bus bar at a first position spaced apart from the coil portions in an axial direction, and the mounting portion fixes the intermediate bus bars at a second position between the first position and the coil portions in the axial direction; and
    the supporting portion includes a first supporting portion installed on the intermediate bus bar, the mounting portion includes an accommodation groove to accommodate at least a portion of the intermediate bus bar, and the first supporting portion is a protrusion elastically abutting an inner side surface of the accommodation groove.

11. A motor comprising:
    a rotor rotatable about a central axis extending in a vertical direction; and
    an annular stator facing the rotor in a radial direction to drive the rotor; wherein
    the stator includes a stator core disposed about the central axis, an insulator covering the stator core, coil portions installed on the stator core through the insulator, and an intermediate bus bar electrically connected to a portion of a conducting wire constituting the coil portions;
    the intermediate bus bar includes a holding portion electrically connected to the conducting wire, the insulator includes a mounting portion on which the intermediate bus bar is mounted, at least one of the intermediate bus bar and the mounting portion includes a supporting portion capable of supporting the intermediate bus bar at a first position spaced apart from the coil portions in an axial direction, and the mounting portion fixes the intermediate bus bars at a second position between the first position and the coil portions in the axial direction; and
    the coil portions include a U-phase coil portion, a V-phase coil portion, and a W-phase coil portion, the U-phase coil portion, the V-phase coil portion, and the W-phase coil portion have different electrical phases from each other and are delta-connected through a connection wire, at least three intermediate bus bars are provided, a first terminal portion between the U-phase coil portion and the W-phase coil portion, a second terminal portion between the V-phase coil portion and the U-phase coil portion, and a third terminal portion between the W-phase coil portion and the V-phase coil portion are connected to the different intermediate bus bars, respectively.

* * * * *